(12) United States Patent
Bishop et al.

(10) Patent No.: US 11,544,388 B2
(45) Date of Patent: Jan. 3, 2023

(54) DISTRIBUTED PARALLEL DATA PROTECTION SYSTEM AND METHOD

(71) Applicant: IEX GROUP, INC., New York, NY (US)

(72) Inventors: Allison Breton Bishop, New York, NY (US); James Michael Cape, San Francisco, CA (US); Robert Park, New York, NY (US); Prerak Pukhraj Sanghvi, Jersey City, NJ (US); Lieting Yu, Jersey City, NJ (US)

(73) Assignee: IEX Group, Inc., New York, NY (US)

( * ) Notice: Subject to any disclaimer, the term of this patent is extended or adjusted under 35 U.S.C. 154(b) by 60 days.

(21) Appl. No.: 16/708,188

(22) Filed: Dec. 9, 2019

(65) Prior Publication Data

US 2020/0184086 A1 Jun. 11, 2020

Related U.S. Application Data

(60) Provisional application No. 62/776,552, filed on Dec. 7, 2018.

(51) Int. Cl.
*G06F 21/60* (2013.01)
*H04L 9/08* (2006.01)
*H04L 9/14* (2006.01)

(52) U.S. Cl.
CPC .......... *G06F 21/602* (2013.01); *H04L 9/0861* (2013.01); *H04L 9/14* (2013.01)

(58) Field of Classification Search
CPC ....... G06F 21/602; H04L 9/0861; H04L 9/14; H04L 9/085
See application file for complete search history.

(56) References Cited

U.S. PATENT DOCUMENTS

| 8,855,318 | B1 | 10/2014 | Patnala | |
|---|---|---|---|---|
| 9,104,691 | B2* | 8/2015 | Resch | H04L 67/1097 |
| 2004/0086261 | A1* | 5/2004 | Hanes | G11B 20/00086 |
| | | | | 386/241 |
| 2008/0165249 | A1* | 7/2008 | DeKeyser | G11B 27/102 |
| | | | | 348/143 |
| 2015/0127946 | A1* | 5/2015 | Miller | H04L 9/0897 |
| | | | | 713/171 |

(Continued)

OTHER PUBLICATIONS

International Search Report in PCT/US2019/065273, dated Feb. 14, 2020, 6 pages.

(Continued)

*Primary Examiner* — Abiy Getachew
(74) *Attorney, Agent, or Firm* — Goodwin Procter LLP

(57) ABSTRACT

A method and system operate to secure and efficiently manage data. The method includes performing steps such as generating independent keys corresponding to multiple portions of segmented data and utilizing the independent keys to encrypt the multiple portions of segmented data. The method additionally includes generating a master key, encrypting the independent keys with the master key, and storing each portion of the segmented data adjacent to the corresponding independent key in a data and key storage device. The method additionally includes segmenting the master key, thereby creating multiple master key segments and storing the multiple master key segments in disparate locations separate from the data.

20 Claims, 7 Drawing Sheets

(56) References Cited

U.S. PATENT DOCUMENTS

2016/0267291 A1* 9/2016 Androulaki ........... G06F 3/0641
2020/0184086 A1* 6/2020 Bishop .................. G06F 21/602

OTHER PUBLICATIONS

Written Opinion, dated Feb. 14, 2020, 10 pages.
Xu Dongyang et al: "Fine-grained document sharing using attribute-based encryption in cloud servers", Third International Conference on Innovative Computing Technology (Intech 2013), IEEE, Aug. 29, 2013 (Aug. 29, 2013), pp. 65-70.

* cited by examiner

DISTRIBUTED PARALLEL DATA PROTECTION SYSTEM AND METHOD

CROSS-REFERENCE TO RELATED APPLICATIONS

This application claims priority to and benefit of U.S. Provisional Patent Application No. 62/776,552, entitled "Distributed Parallel Data Protection System and Method," filed Dec. 7, 2018, the entire contents of which are incorporated herein by reference.

TECHNICAL FIELD

This disclosure is generally related to systems and methods for storing and managing large amounts of data with minimal risk and maximal efficiency.

BACKGROUND

The proliferation of online transactions has led to the need for efficient storage and management of large amounts of data. Because the nature of the data is often sensitive, it is also necessary to secure the data for storage and management. Fraudulent data access in many industries, such as, for example, insurance, banking, healthcare, finance, government, retail etc., has become increasingly sophisticated and problematic. Because of the need to secure these large quantities of data, various data security techniques have evolved.

In many systems storing large amounts of data, data encryption schemes are provided to enhance the security of data. The data encryption schemes have evolved over time to provide increased security and enhanced performance characteristics.

The development of data encryption schemes should take into account the evolving threats to data security and deficiencies with presently existing schemes. For example, systems are known that utilize keys to encrypt and decrypt data. However, use of a single key to encrypt and decrypt multiple segments of data can result in the compromise of a large amount of data if the key is compromised. Thus, systems such as public key cryptography or asymmetric cryptography use pairs of keys including public keys that are widely disseminated and private keys known only to the owner. The public key can be used to encrypt the data, but the private key is necessary to decrypt the data. Because of the computational complexity of asymmetric encryption, it is generally used only for small blocks of data as it can be too slow to efficiently manage large amounts of data.

To overcome this difficulty, a technique known as envelope encryption, utilizes multiple layers of keys. In other words, envelope encryption is the process of encrypting a first key with another second key. Thus, the second key is used to protect the first key. The first key and the data may be packaged together in an envelope, while the second key may be maintained at a key management server.

As set forth above, while public key encryption is generally considered secure, it is too slow for efficient use with large amounts of data. Symmetric encryption (using a single key for encryption and decryption) is more efficient, but less secure because the single key presents a single point of failure. Envelope encryption adds a layer of security to the symmetric encryption; however, significant risk remains that the master key may be compromised. If compromised, the master key used to encrypt the first key also presents a significant risk.

Accordingly, an opportunity exists to significantly enhance data security and efficient data management in systems storing large amounts of data. A system is needed that improves upon the speed of public key encryption and improves upon the security of symmetric encryption and envelope encryption.

SUMMARY

In one aspect, a method for protecting and storing data is provided. The method includes utilizing multiple storage devices in disparate locations and performing operations using at least one processor of a data protection server connected over a network with the multiple storage devices. The operations include operating on multiple portions of segmented data, generating independent keys, and utilizing the independent keys to encrypt each portion of the segmented data. The operations further include generating a master key, encrypting each independent key using the master key, and storing each portion of the segmented data adjacent to the corresponding independent key in a data and key storage area. The operations additionally include segmenting the master key, thereby creating multiple master key segments and storing the multiple master key segments in disparate locations separate from the data and the independent keys.

In another aspect, a system is provided for protecting and storing data. The system comprises multiple storage devices in disparate locations and a data protection server connected over a network with the multiple storage devices. The data protection server has at least one processor configured for operating on multiple portions of segmented data. The processor further generates and utilizes an independent data key to encrypt each portion of the segmented data. The processor further generates a master key and encrypts each independent key using the master key. The processor further stores each portion of the segmented data adjacent to a corresponding independent key in a data and key storage area. The processor additionally segments the master key, thereby creating multiple master key segments, and stores the multiple master key segments separately from the data.

BRIEF DESCRIPTION OF THE DRAWINGS

Embodiments of the present invention are described in detail below with reference to the attached drawings figures, wherein.

DETAILED DESCRIPTION

Various embodiments describe a system and method for storing and managing large amounts of data in a secure and efficient manner.

Figure 1:
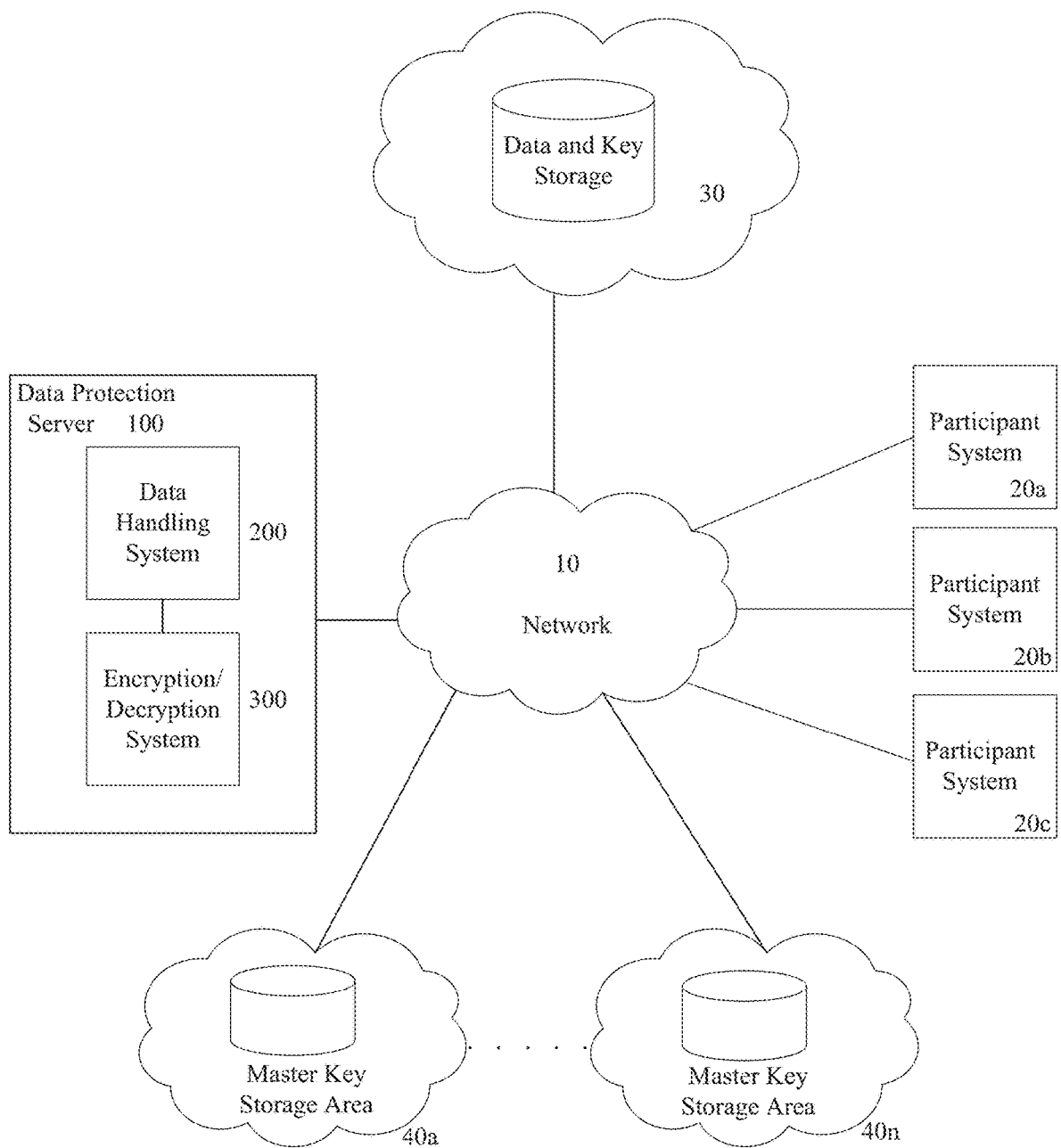
FIG. 1 is a block diagram illustrating an operating environment for a data storage and protection system in accordance with one embodiment.

FIG. 1 is a block diagram illustrating an operating environment for a data storage and protection system in accordance with one embodiment. The displayed embodiment can be used in any industry or system that has the goal of securely storing and managing large amounts of data. It should be understood that the operating environment can be configured to facilitate storage and management of data for any type of transaction.

Participant systems 20a, 20b, 20c are connected over a network 10 with a data protection server 100 and storage areas 30 and 40a . . . n. It should be understood that any number of participant systems and any number of additional storage areas are contemplated. Additionally, multiple networks 10 and multiple data protection servers 100 may also be included.

The network 10 is shown as one network but may include multiple networks of diverse types connecting the different components. Networks may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The participant systems 20a . . . c may be or include any computing device adapted to receive and transmit information. Thus the participant systems 20 include at least one processor and one or more applications executed on the processor. The participant systems 20 may enter information through a user interface. The participant systems 20 may include a browser for accessing software applications provided by a host system or other connected systems that offer such functionality over the Internet or any other network. The participant systems 20 may additionally be or include a mobile system, such as a smart phone, tablet, or other portable computing apparatus. Mobile computing systems may execute downloadable applications for operating in conjunction with connected systems. The downloadable applications may be stored in memory and executed by processors on the mobile systems and may provide a plurality of user interfaces.

The data and key storage area 30 may be or include a memory structure capable of storing large amounts of data. Embodiments of a storage environment are further illustrated in FIG. 5 and are further described below. The stored data in the input and output databases may be structured, semi-structured, or unstructured. The data storage areas may include file systems and databases for storing large amounts of data. For example, the data storage areas may include HP 3PAR StoreServ® Storage systems. Those of ordinary skill in the art will appreciate that other computer storage systems for storing large amounts of data may be implemented. Data stored in the data storage areas may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data. The master key storage areas 40a . . . 40b may encompass similar storage areas and may be stored, for example, on different clouds serviced by different cloud service providers.

The data protection server 100 may be or include a computing system having the capability to process and secure large amounts of data. The data protection server 100 may include a data handling system 200 and an encryption/decryption system that may for example include a key management server. The data protection server 100 may be included in a host system or platform at a financial services firm, a financial institution or other institution with an interest in combatting fraud. Accordingly, the host system may include, for example financial management systems, secure entry systems, data access systems, account processing systems, credit card processing systems, and other known systems. Embodiments and components of the data protection server are further described below with reference to FIGS. 2-5.

Figure 2:
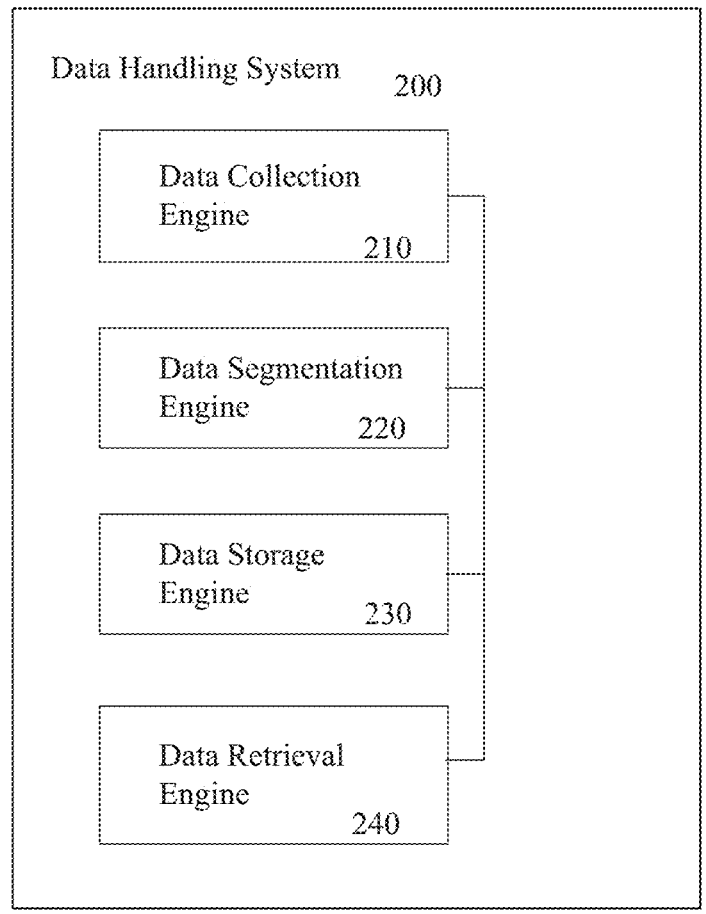
FIG. 2 is a block diagram illustrating components of a data handling system of the data storage and protection engine in accordance with some embodiments.

FIG. 2 is a block diagram illustrating components of a data handling system of the data storage and protection engine in accordance with some embodiments. A data handling system 200 may include a data collection engine 210, a data segmentation engine 220, a data storage engine 230 and a data retrieval engine 240. The data collection engine 210 may interface over the network with the participant systems described above with reference to FIG. 1 in order to collect data from these systems. The data segmentation engine 220 may operate to segment the data. For example, the data segmentation engine 220 may separate the data into chunks of fixed size. Thus, as an example, if a fixed size of 32 MB is selected, any file that is larger than 32 MB will be broken down into chunks of 32 MB. The final chunk would therefore likely be smaller than 32 MB. After segmentation of the data, the data storage engine 230 may operate to store the segmented data in encrypted form in parallel in the storage areas as will further be described below. The data retrieval engine may operate in conjunction with the encryption decryption system 300 of FIG. 1 in order to retrieve and decrypt stored data.

Figure 3:
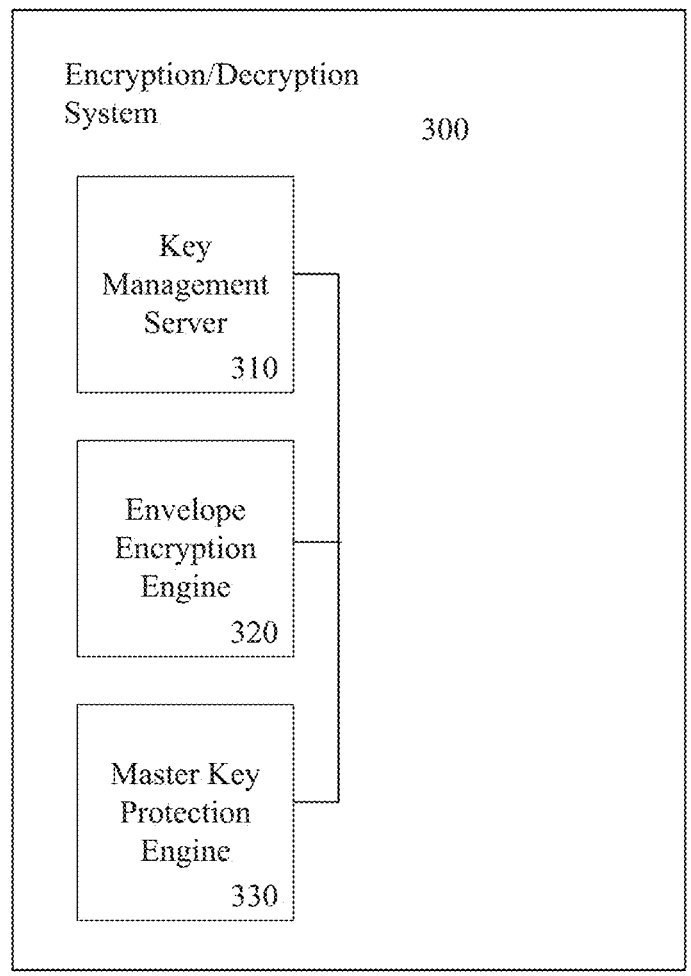
FIG. 3 is a block diagram illustrating an encryption/decryption system in in accordance with one embodiment.

FIG. 3 is a block diagram illustrating an encryption/decryption system in in accordance with one embodiment. The encryption/decryption system 300 may be or include a key management server 310, an envelope encryption engine 320, and a master key protection engine 330.

The key management server 310 generates independent keys capable of encrypting and decrypting corresponding data segments. The independence of the keys avoids common pitfalls associated with using a single key to continually perform segments in parallel as such methods require careful maintenance of state. The key management server 310 may further generate a master key The envelope encryption engine 320 adds an extra layer of security by encrypting the independent keys with the master key. Because the independent keys are encrypted, they can be safely stored alongside the corresponding data segments. As will be further described below, the master key is not stored with the data. Because the master key is used only to encrypt the independent keys and not the data, the amount of ciphertext produced is reduced and the susceptibility to potential cryptanalysis attacks that require a large amount of ciphertext per key is mitigated.

The master key protection engine 330 functions to segment the master key into "n" shares, such that any subset of "t" shares can be used to recover the master key, but any subset of strictly less than "t" of them reveals no information. The master key protection engine 330 stores the shares in separate and distinct logical/physical location, and these locations can be chosen to reduce correlation between their potentials to be compromised. Although the encryption/decryption system 300 is shown with these particular components, the functionality may actually be spread over a larger number of components or separately displayed components may be combined into single components.

Figure 4:
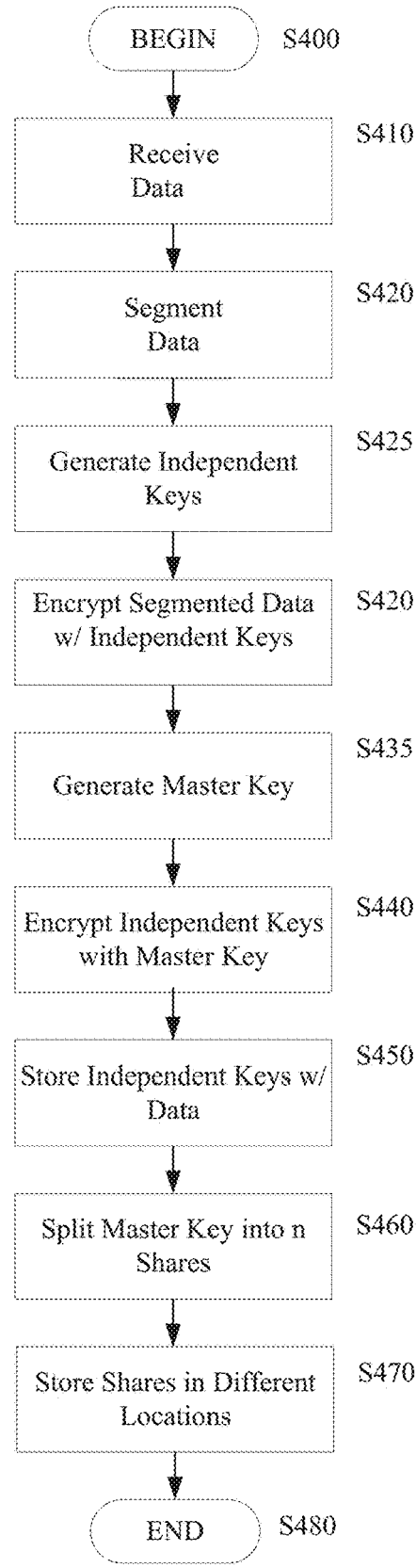
FIG. 4 is a flow chart illustrating operation of the data storage and protection system in accordance with one embodiment.

FIG. 4 is a flow chart illustrating operation of the data storage and protection system for securing data in accordance with one embodiment. This flow chart is merely exemplary. A change in the order of these steps and the combination and/or removal of steps are contemplated. The process begins in S400 and the data handling system receives data in S410. The data handling system segments the data in S420. In S425 a key management server of the encryption/decryption system generates independent keys and the envelope encryption engine encrypts the segmented data using the independent keys in S430. In S435, the data protection server generates a master key. In S440, the data protection system encrypts the independent keys with the master key. In S450, the data handling system stores the encrypted independent keys alongside the corresponding segmented data in a designated data storage area. In some embodiments, the data and independent keys can be spread across multiple cloud providers.

In S460, the data protection system splits the master key into multiple (n) shards. In S470, the data protection system stores the shares in disparate locations. In one embodiment, the master key storage scheme is selected based on an algorithm disclosed by Adi Shamir and known as "Shamir's Secret Sharing" (See Shamir, Adi, "How to Share a Secret"; Programming Techniques, pages 612, 613, November 1979, incorporated herein by reference in its entirety.) The master key is stored such that any subset of "t" of the "n" shares can be used to recover the master key. However, any subset of less than "t" shares reveals no information. The shards are preferably stored in different logical and/or physical locations and these locations can be chosen to reduce correlation between their potentials to be compromised. Accordingly, multiple physical locations such as multiple clouds would need to be compromised before stored key shares or stored data would be vulnerable. Redundancy of the encrypted data storage as well as implicit redundancy of the master key storage through the many shards protects against data loss without compromising security. Since the master key is never stored with the data, the encrypted data storage could be fully compromised without revealing anything about the underlying data other than its size. The process ends in S480.

Figure 5:
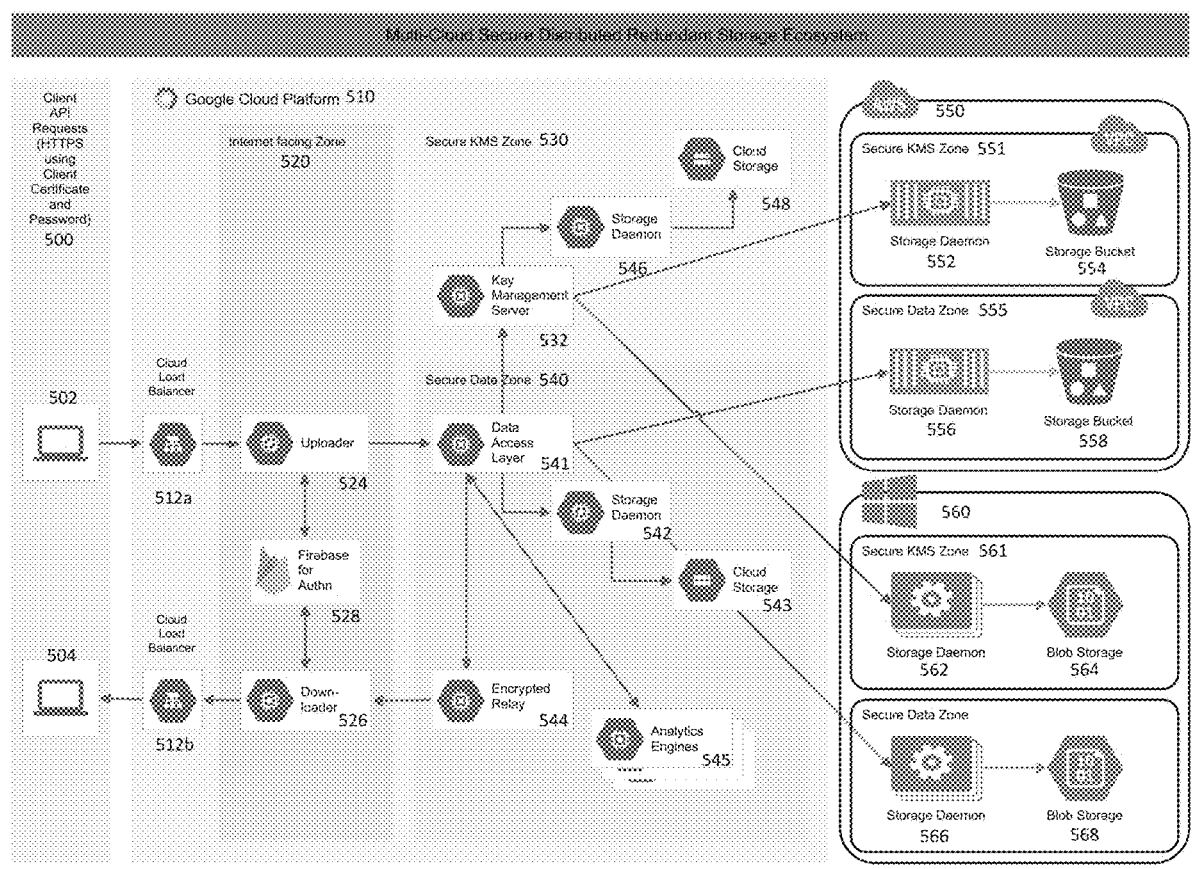
FIG. 5 is a block diagram illustrating a storage environment of the data protection system in accordance with one embodiment.

FIG. 5 is a block diagram illustrating a storage environment 500 of the data protection system in accordance with one embodiment. Client or participant requests may originate and be fulfilled at client devices 502 and 504. The devices 502 and 504 may access a cloud platform 510 and may receive and transmit data through load balancers 512*a* and 512*b*. Uploader 524 and downloader 526 are shown as positioned within an Internet facing zone 520 and connect through firebase 528.

The uploader 524 and downloader 528 access a secure key management server zone 530. The secure key management server zone 530 includes the key management server 532, while the secure data zone 540 includes the data access layer 541 receiving requests from the uploader 524. The key management server 540 and data access layer 541 connect to storage daemons 542 and 546 and cloud storage areas 543 and 548. The data access layer further can relay information back to the Internet facing zone 520 through an encrypted relay 544 and exchange information with analytics engines 545.

Figure 6:
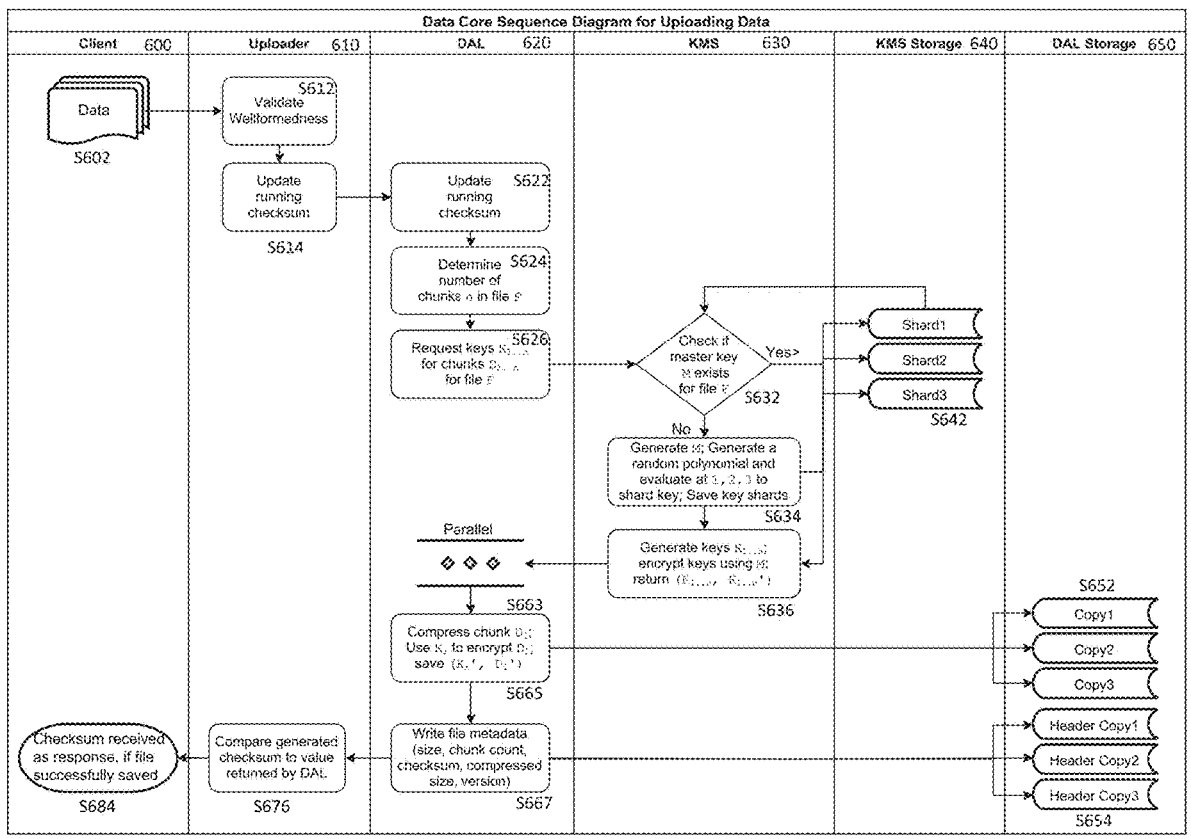
FIG. 6 is a sequence diagram for uploading data and generating keys within the data protection system environment.

FIG. 6 is a sequence diagram for uploading data and generating keys within the data protection system environment in accordance with one embodiment. FIG. 6 further illustrates the location of the various steps within the uploading process. As illustrated, steps may occur at the client or participant level 600, at the uploader 610, in the data access layer (DAL) 620, at the key management server 630, at key management storage 640, and at DAL storage 650. Data is transmitted from the client or participant at S602. The system validates wellformedness at S612 and updates a running checksum at S614 and S622.

At S624, the system determines the number of data chunks of in the file and requests keys for the chunks in S626. In S632, the key management server determines if a master key exists for the file. If a master key does not exist for the file, the key management server generates a new master key in S634, then divides the master key into shards according to the Shamir Secret Sharing scheme and stores them in S642. Segmentation techniques other than Shamir Secret Sharing may also be used in different embodiments. If a master key exists but is not segmented, the master key may be divided into shards and stored in S642. As was described above, the master key is preferably stored in a distributed manner so that no individual cloud provider has enough shards to reconstruct the master key. Furthermore, copies of the shards may be stored in multiple regions or geographic locations for redundancy purposes.

In some cases, a master key may be distributed across different storage systems that are operated and/or controlled by different entities (such as one or more cloud service provides, one or more computing service providers, one or more storage providers, and/or a combination of different types of providers, etc.). An outsider, e.g., a person not associated with any of these entities, who may gain unauthorized access to the computing/storage systems of one or a few entities may nevertheless not gain access to the computing/storage systems of a sufficient number (e.g., at least 10%, 25%, 40%, 60% etc.) of the entities and, as such, the likelihood that such an outsider can successfully reconstruct the master key is minimized. The same is true even in the case of an insider, such as an employee of a particular entity, who may gain access to the computing/storage systems of that entity, but may not gain access to a sufficient number (e.g., at least 10%, 25%, 40% 60% etc.) of entities, to be able to reconstruct successfully the master key.

In S636, the key management server generates independent keys and sends them at S636 to the data access layer 620, which further processes the chunks in parallel. In S665, the system compresses the data chunks and utilizes the independent keys to encrypt the data chunks. The system stores copies of the encrypted information in DAL storage in S652. In S667, the system writes the file metadata, e.g., size, chunk count, checksum, compressed size, version and stores the information in DAL storage in S654. In S676, the system compares the previously generated checksum to the checksum generated in S667. In S684, the checksum is received as response to the client request if the file is successfully saved.

Figure 7:
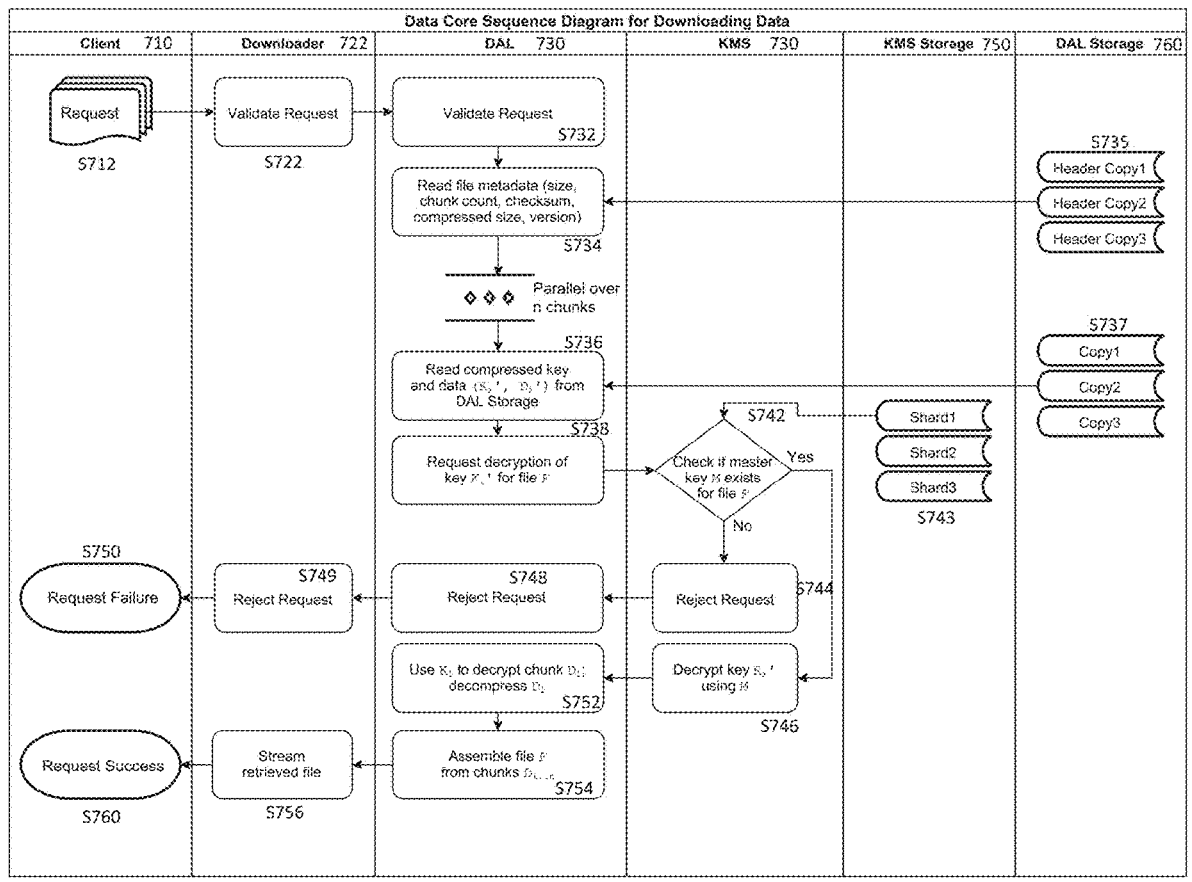
FIG. 7 is a sequence diagram for downloading data from the storage environment in accordance with one embodiment.

FIG. 7 is a sequence diagram 700 for downloading data from the storage environment in accordance with one embodiment. The diagram illustrates components of the system environment in which the downloading steps may occur. The components include client 710, downloader 720, data access layer (DAL) 730, key management server 740, key management server storage 750, and DAL storage 760.

A client or participant sends a download request in S712 and the system validates the request in S722 and S732. In S734, the system reads the file metadata, including the count of file chunks, from the DAL storage. In S736, in parallel for multiple chunks, the system reads the encrypted key and compressed data from the DAL storage and requests decryption of independent keys in S738. In S742, the key management server checks to determine if a master key exists for the requested file. If no master key exists, the request is rejected (S744, S748, S749) and ultimately fails in S750. If the master key does exist, the shards are retrieved from storage in S743, the master key is reconstructed, and the independent key can be decrypted using the master key in S746.

The decrypted independent keys can then be used to decrypt the respective individual data chunks, which can also be decompressed in S752. In S754, the system assembles the file from the decrypted and decompressed data chunks. The system streams the retrieved file in S756 and the request is successfully completed in S760.

One technical advantage of the various systems and methods described above is improved protection of data compared to many conventional encryption systems. In a typical conventional data storage system, anyone seeking unauthorized access to data may be able to do so by obtaining a key used for decrypting the encrypted data and by also obtaining the master key, if needed. In contrast, according to various systems and methods described herein, one seeking unauthorized access would need to obtain additional information such as the number of segments of the encrypted data, the physical and/or logical locations of such segments, the number of segments of the master key, and the physical and/or logical locations of the segments of the master key. The number of segments of the master key can be different from the number of segments of the data, and the locations of the master key segments can be at least partially different from the locations of the encrypted data segments. Moreover, one seeking unauthorized access would need to obtain not just one data decryption key but several such keys. These additional requirements can increase the robustness of the storage system against unauthorized access.

Another technical advantage is that once the data to be protected and stored is partitioned into several segments, each segment can be encrypted using its one encryption key, and these operations can be performed in parallel, using different processors and/or cores, which can speed up the encryption of a large data object. Likewise, authorized access to stored, encrypted data can also be sped up because once the master key is assembled and the decryption keys for individual segments are generated, the decryption of different segments can be performed in parallel.

The system as illustrated in the block diagrams and flowcharts of FIGS. 1-7 includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with different embodiments described herein.

All of the components shown in the figures above may be, include, or be implemented by a computer or multiple computers. The system implementing various embodiments or portions of the system may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement one or more embodiments may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes according to various embodiments.

The processing machine used to implement some embodiments may utilize a suitable operating system. Thus, some embodiments may include a processing machine running the Microsoft Windows™ Vista™ operating system, the Microsoft Windows™ XP™ operating system, the Microsoft Windows™ NT™ operating system, the Windows™2000 operating system, the Windows™8 or 10 operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system, Android™ OS, a mobile OS, or another operating system or platform. It is appreciated that in order to practice the steps of methods according to various embodiments described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in performing the operations of various processes described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of various processes may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments described herein. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of systems and methods according to various embodiments. Rather, any number of different programming languages may be utilized as is necessary or desirable.

Also, the instructions and/or data used in performing various operations included in different embodiments may utilize any compression or encryption technique or algorithm, as may be desired. An encryption module might be used to encrypt data. Further, files or other data may be decrypted using a suitable decryption module, for example.

As described above, several embodiments may be implemented in the form of a processing machine, including a computer or computer system, for example, that includes at least one memory. It is to be appreciated that the set of instructions, i.e., the software for example that enables the computer operating system to perform the operations described above, may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in various embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors used in different embodiments.

Further, the memory or memories used in the processing machine that implements a particular embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In systems and methods according to various embodiments, a variety of "user interfaces" may be utilized to allow a user to interface with the processing machine or machines that are used to implement a particular embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods described herein, it is not necessary that a human user actually interact with a user interface used by the processing machine used for implementing a particular system or a machine. Rather, it is also contemplated that the user interface might interact, i.e., convey and receive information, with another processing machine, rather than a human user. Accordingly, the other processing machine might be characterized as a user. Further, it is contemplated that a user interface utilized in a system or method according to a particular embodiment may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of disclosure.

Accordingly, while various systems and methods are described herein in detail and in relation to certain exemplary embodiments, it is to be understood that this disclosure is only illustrative and is made to provide an enabling disclosure of the systems and methods described herein. Accordingly, the foregoing disclosure is not intended to be construed or to limit any claimed system or method or otherwise to exclude any other such embodiments, adaptations, variations, modifications and equivalent arrangements.

While particular embodiments have been illustrated and described in detail herein, it should be understood that various changes and modifications might be made to the claimed systems and methods without departing from the scope and intent of the disclosure.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A method for protecting and storing data, the method comprising:
    utilizing multiple storage devices in disparate locations; and
    performing operations using at least one processor of a data protection server connected over a network with the multiple storage devices, the operations including:
        generating independent keys, each independent key corresponding to a respective portion of segmented data;
        encrypting each portion of segmented data with a respective independent key;
        generating a master key;
        encrypting the independent keys with the master key;
        storing each portion of the segmented data adjacent to the corresponding encrypted independent key in a data and key storage device;
        segmenting the master key, thereby creating multiple master key segments; and
        storing the multiple master key segments in respective ones of the multiple storage devices in the disparate locations separate from the data.

2. The method of claim 1, further comprising receiving data over a network from participant systems and segmenting the received data into multiple portions of the segmented data.

3. The method of claim 1, wherein segmenting the master key comprises segmenting the master key into "n" shares, wherein a quantity of at least "t" of the "n" shares is required to recover the master key.

4. The method of claim 3, wherein any subset of fewer than "t" shares reveals no information.

5. The method of claim 1, further comprising choosing the disparate locations to reduce chances of compromising security.

6. The method of claim 1, wherein the multiple storage devices are spread across multiple logical locations, or multiple physical locations, or a combination of at least one logical and at least one physical location.

7. The method of claim 6, further comprising storing the segmented data across multiple logical locations, or multiple physical locations, or a combination of at least one logical and at least one physical location.

8. The method of claim 6, further comprising storing the master key segments across multiple logical locations, or multiple physical locations, or a combination of at least one logical and at least one physical location.

9. A system for protecting and storing data, the system comprising:
    multiple storage devices in disparate locations; and
    a data protection server connected over a network with the multiple storage devices, the data protection server having at least one processor configured for:
        generating independent keys, each independent key corresponding to respective portion of segmented data;
        encrypting each portion of the segmented data with a respective independent key;
        encrypting the independent keys using a master key;
        storing each portion of the segmented data adjacent to the corresponding encrypted independent key in a data and key storage area;
        segmenting the master key creating multiple master key segments; and
        storing the multiple master key segments in respective ones of the multiple storage devices in the disparate locations separate from the data.

10. The system of claim 9, wherein the processor receives data over a network from participant systems and segments the received data into multiple portions of the segmented data.

11. The system of claim 9, wherein segmenting the master key comprises segmenting the master key into "n" shares, wherein a quantity of at least "t" of the "n" shares is required to recover the master key.

12. The system of claim 11, wherein any subset of fewer than "t" shares reveals no information.

13. The system of claim 9, further comprising choosing the disparate locations to reduce chances of compromising security.

14. The system of claim 9, wherein the multiple storage devices are spread across multiple logical locations, or multiple physical locations, or a combination of at least one logical and at least one physical location.

15. The system of claim 14, further comprising storing the segmented data across multiple logical locations, or multiple physical locations, or a combination of at least one logical and at least one physical location.

16. The method of claim 14, further comprising storing the master key segments across multiple logical locations, or multiple physical locations, or a combination of at least one logical and at least one physical location.

17. A non-transitory computer readable medium storing instructions executable by at least one processor for securing and managing data by executing instructions to perform steps including:
- generating independent keys each independent key corresponding to a respective portion of segmented data;
- encrypting each portion of segmented data with a respective independent key;
- generating a master key;
- encrypting the independent keys with the master key;
- storing each portion of the segmented data adjacent to the corresponding encrypted independent key in a data and key storage device;
- segmenting the master key, thereby creating multiple master key segments; and
- storing the multiple master key segments in respective ones of the multiple storage devices in the disparate locations separate from the data.

18. The non-transitory computer readable medium of claim 17, wherein the steps further comprise receiving data over a network from participant systems and segmenting the received data into multiple portions of the segmented data.

19. The non-transitory computer readable medium of claim 17, wherein segmenting the master key comprises segmenting the master key into "n" shares, wherein a quantity of at least "t" of the "n" shares is required to recover the master key.

20. The non-transitory computer readable medium of claim 17, wherein the steps further comprise choosing the disparate locations to reduce chances of compromising security.

* * * * *